United States Patent [19]

Miller

[11] 4,372,645
[45] Feb. 8, 1983

[54] OPTICAL FIBER WITH ENHANCED MODE COUPLING

[75] Inventor: Stewart E. Miller, Locust, N.J.

[73] Assignee: Bell Telephone Laboratories, Incorporated, Murray Hill, N.J.

[21] Appl. No.: 291,311

[22] Filed: Aug. 10, 1981

Related U.S. Application Data

[63] Continuation-in-part of Ser. No. 885,445, Mar. 10, 1978, Pat. No. 4,308,045.

[51] Int. Cl.³ .............................................. G02B 5/172
[52] U.S. Cl. .................................................. 350/96.30
[58] Field of Search ............... 350/92.29, 96.30, 96.31, 350/96.33

[56] References Cited

U.S. PATENT DOCUMENTS

| | | | |
|---|---|---|---|
| 3,687,514 | 8/1972 | Miller et al. | 350/96.15 |
| 3,909,110 | 9/1975 | Marcuse | 350/96.15 |
| 3,912,478 | 10/1975 | Presby | 65/2 |
| 3,976,356 | 8/1976 | Jenkins | 350/96.30 |
| 4,038,062 | 7/1977 | Presby | 65/2 |
| 4,049,413 | 9/1977 | French | 350/96.29 |

OTHER PUBLICATIONS

Proc. IEEE, vol. 61-Dec. 1978-"Research Toward Optical Fiber Transmission Systems Part I; The Transmission Medium"-pp. 4 and 19.

*Primary Examiner*—John D. Lee
*Assistant Examiner*—Frank Gonzalez
*Attorney, Agent, or Firm*—S. Sherman

[57] ABSTRACT

Optical fibers having enhanced mode coupling produced by an asymmetric refractive index profile that varies periodically along the length of the fiber are described. The prescribed variations are obtained by means of a fabrication process that includes periodically varying the source of at least one of the fiber materials in a direction transverse to the fiber-drawing direction. This transverse periodicity is translated into the desired longitudinal periodicity along the fiber by the fiber-drawing process.

4 Claims, 11 Drawing Figures

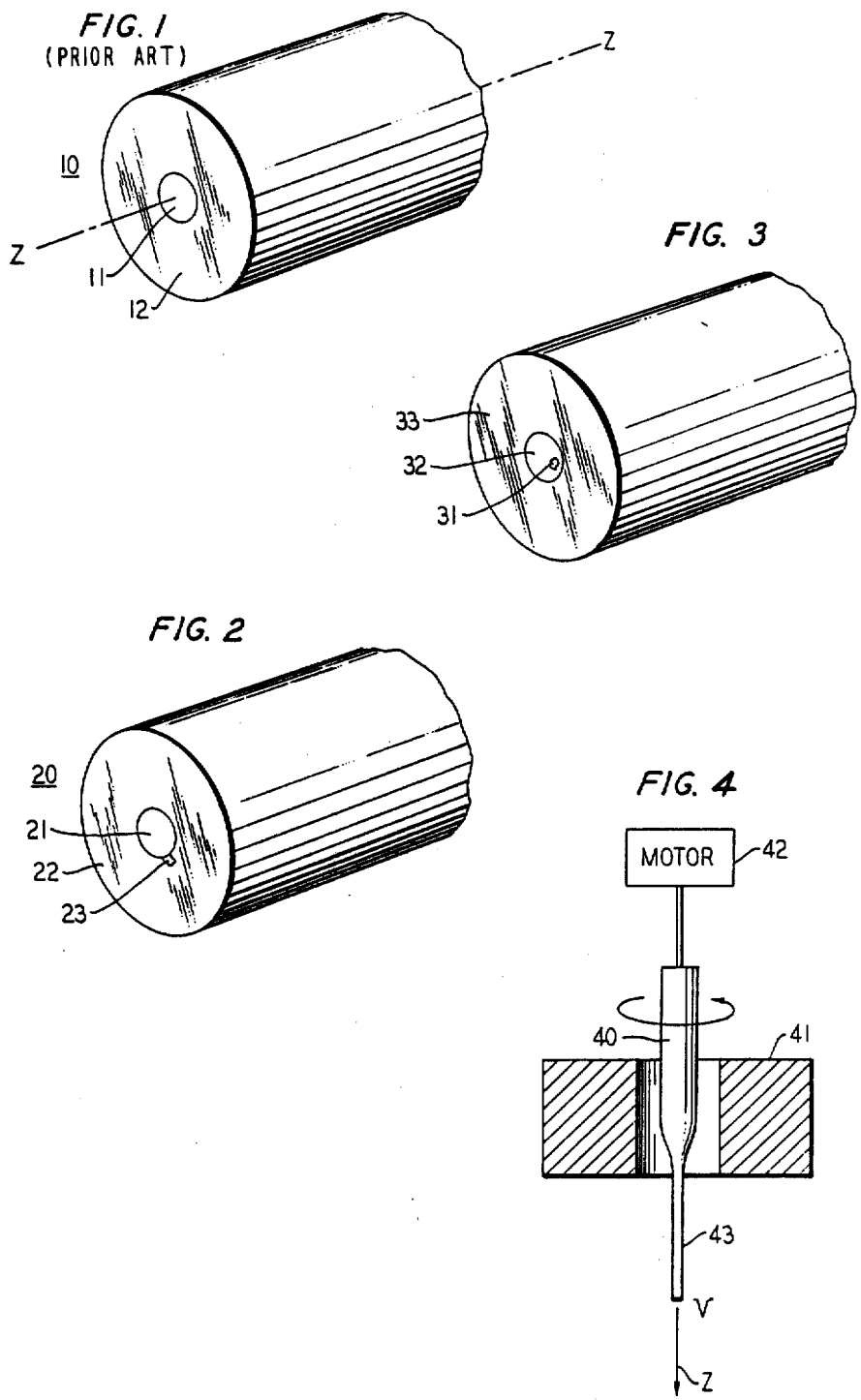

OPTICAL FIBER WITH ENHANCED MODE COUPLING

This application is a continuation-in-part of copending application Ser. No. 885,445, filed Mar. 10, 1978, now U.S. Pat. No. 4,308,045.

TECHNICAL FIELD

This invention relates to multimode optical fibers having prescribed spatial variations for introducing controlled mode coupling.

BACKGROUND OF THE INVENTION

In U.S. Pat. No. 3,687,514 it is shown that the mode dispersion in a multimode waveguide can be reduced by deliberately enhancing the mode conversion processes in the waveguide. This is accomplished by introducing "imperfections" in the waveguide, such as changes in the cross-sectional dimensions of the guide and/or changes in the orientation of the guide axis. Arrangements for fabricating optical fibers having such variations are described in U.S. Pat. No. 4,038,062; 3,912,478; and the previously cited U.S. Pat. No. 3,687,514. However, the periodicity of the resulting spatial variations produced by all of these techniques tends to be much greater than one would like. As a result, the net coupling length for the fiber is relatively large and the reduction in the dispersion is correspondingly small.

In an alternative technique, described in U.S. Pat. No. 3,909,110, refractive index variations are built into the preform from which the fiber is to be pulled. This particular technique, however, requires considerable care in the preparation of the preform and, hence, tends to be a relatively expensive method. It will be noted that it is a characteristic of all of the above-described fabrication techniques that axial symmetry is maintained as a function of location along the fiber.

SUMMARY OF THE INVENTION

A typical optical fiber comprises an inner circular cylindrical core region surrounded by an outer, circular cylindrical cladding region of lower refractive index. The core and cladding regions are generally coaxially aligned, and maintain circular symmetry along the entire length of the fiber. By contrast, in a fiber in accordance with the present invention, a cross-sectional asymmetry is deliberately introduced. This asymmetry may comprise, for example, a third region which meanders about the longitudinal axis of the fiber core region. The third region can either be embedded within the core region, or it can be located within the cladding region sufficiently close to the core region so as to affect the light being guided by the core. Alternatively, the core region itself can meander about the longitudinal axis of the fiber. In either arrangement, there is a transverse displacement of some region of the fiber which varies as a function of distance along the fiber. To produce the desired mode coupling, the rate at which this displacement occurs is such that the resulting longitudinal spatial variation has significant spectral components at the beat wavelengths of the modes guided by the fiber.

Various techniques for fabricating fibers having the above-described configurations are described. In general, the method of fabricating optical fibers in accordance with the present invention comprises the steps of: providing a supply of fiber forming materials that includes at least a core material and a cladding material of lower refractive index; heating said materials to a molten state; and drawing a fiber from said supply; characterized in that the location of the source of at least one of said fiber forming materials is caused to change as the fiber is drawn. This can be accomplished in a number of ways. If a solid preform is used, the preform is provided with a refractive index asymmetry and is rotated as the fiber is drawn. Using the double-crucible method of fiber fabrication, the same effect is produced by causing the source of core material to move in a direction transverse to the fiber-drawing direction, or by providing the inner crucible, containing the core material, with an asymmetric outlet aperture, and rotating the crucible. In either case, a transverse periodicity or circular asymmetry is translated into the desired longitudinal periodicity by the fiber-drawing process.

It is an advantage of the invention that the spatial variations in the resulting fiber are inherent in the method of fabrication, rather than impressed upon the fiber after it is drawn.

BRIEF DESCRIPTION OF THE DRAWING

FIG. 1 shows a typical optical fiber preform with a symmetrical refractive index profile;

FIGS. 2 and 3 show modified optical fiber preforms including a refractive index irregularity in the cladding and in the core regions, respectively;

FIG. 4 shows an arrangement for drawing an optical fiber, having enhanced mode coupling, from a preform of the type illustrated in either FIG. 2 or FIG. 3;

DETAILED DESCRIPTION

Figure 5:
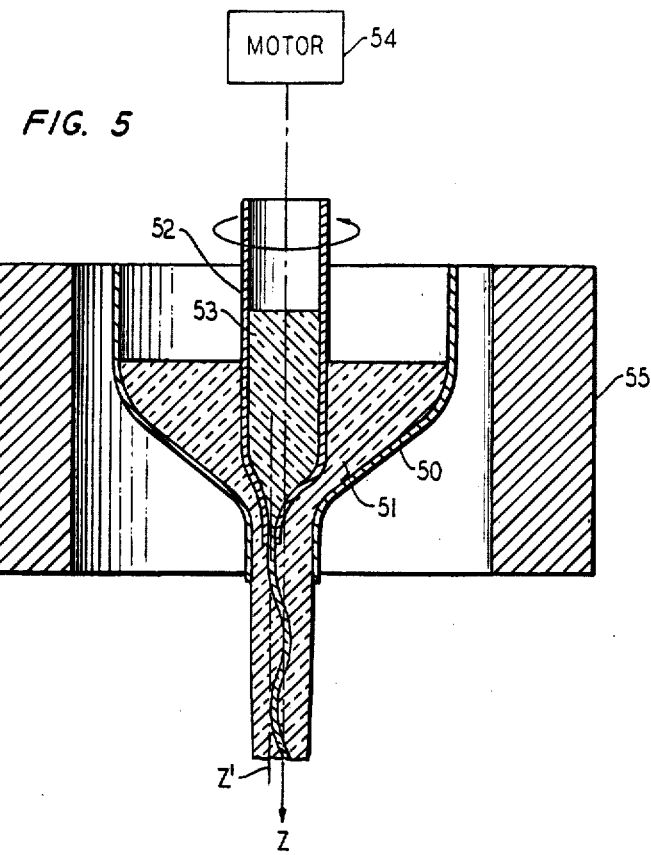
FIG. 5 shows an arrangement for drawing an optical fiber, having enhanced mode coupling, using the double-crucible technique.

Referring to the drawings, FIG. 1 shows the cross section of a typical prior art optical fiber preform 10 comprising an inner core region 11 surrounded by an outer cladding 12 of lower refractive index. Great care is usually taken in the manufacture of such preforms to insure that the core region is uniformly circular throughout the length of the preform, and that it is coaxial with the cladding. A fiber drawn from such a preform will maintain this circular symmetry and, in general, the mode coupling will be minimal.

In accordance with one aspect of the present invention, the above-described symmetry is deliberately disrupted by the inclusion in the preform of an index irregularity comprising a third region of different refractive index, as illustrated in FIGS. 2 and 3. In FIG. 2 the preform 20 includes a core region 21 surrounded by a cladding 22 of lower refractive index, as in the preform of FIG. 1. However, a third region 23, adjacent to the core, is included within the cladding. The third region can be contiguous with the core, or located a distance from the core but close enough to intercept a significant portion of the optical wave field guided by the core. The refractive index of the third region can be different than that of both the core and host cladding, or it can be an extension of the core. For the purposes of the present invention it is not important whether the index of region 23 is greater or less than the cladding index. Nor is the shape of the region particularly significant. These factors will be determined primarily by the particular method used to fabricate the preform, and by the dopants used to obtain the desired index profile. What is significant, however, is that the preform index profile no longer has axial symmetry, and, as will be explained in greater detail hereinbelow, the asymmetry is varied longitudinally at an appropriate rate.

In the preform of FIG. 3, the asymmetry is obtained by the inclusion of a third region 31 within the host core 32, rather than within the cladding 33. As above, the refractive index of region 31 is different, either greater or less than that of the core material.

Using either type of preform, or one including both irregularities, a fiber having enhanced mode coupling is obtained by pulling the fiber while, simultaneously, rotating the preform about its longitudinal axis, as illustrated in FIG. 4. Specifically, the preform 40 is placed in an oven 41 (or heated by means of a $CO_2$ laser) so as to reduce it to a molten state, and rotated by a motor 42 as the fiber is pulled. The effect is to create a helically-shaped irregularity in the fiber whose pitch is a function of the pulling rate, v, and the rotational rate of the preform. For example, if the fiber is pulled at the rate of one meter/sec, and a coupling period of 5 mm is desired, the rotation rate of the preform should be $$RPM = 60 \times \frac{1000}{5} = 12,000.$$

It should be noted that the important parameters determining the coupling period are the pulling velocity and the rotational rate. These are selected such that the spatial variations in the direction of wave propagation have a significant component at the beat wavelengths of the modes guided by the fiber. Typically, spatial periods of interest would fall within the range between 0.1 and 10 mm. A significant component would be such as to cause at least a ten percent transfer of power between coupled modes within a distance of one hundred meters. (See, for example, U.S. Pat. No. 3,666,348, and the article by S. E. Miller et al. entitled "Research Toward Optical-Fiber Transmission Systems Part I; The Transmission Medium," published in the December 1973 issue of the *Proc. IEEE, Vol.* 61, pages 1703-1751). The shape of the irregularity in the preform is not critical, nor is the longitudinal uniformity of the preform. Indeed, the very nonuniformities that result in preforms being rejected for normal use may be enough to produce the desired mode coupling if the preform is rotated at the appropriate rate as the fiber is drawn.

The technique described above can be extended to other forms of fiber fabrication as, for example, the double-crucible method, illustrated in FIG. 5. In the double-crucible method, the fiber materials are contained within a pair of crucibles. The outer crucible 50 contains the cladding material 51. The inner crucible 52 contains the core material 53. Both crucibles are located within a suitable oven 55 which maintains the materials in their molten state.

Figure 6:
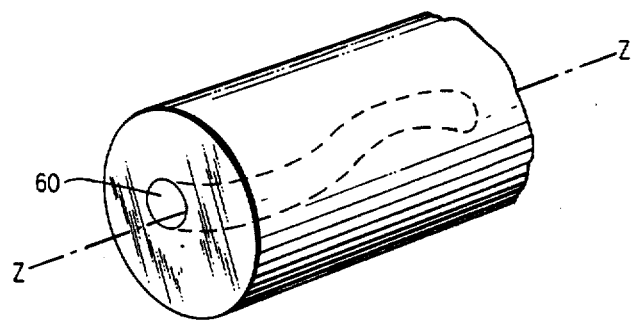
FIG. 6 shows the manner in which the core region meanders in a fiber drawn using the arrangement of FIG. 5.

In the usual arrangement, the outlets of the two crucibles are coaxially aligned. In the particular embodiment shown in FIG. 5, on the other hand, the outlet aperture of the inner crucible is offset, as indicated by the center line Z'-Z'. The effect of this offset is to displace the source of the core material. Thus, if the inner crucible is rotated about the axis Z-Z of the outer crucible by means of a motor 54 as the fiber is drawn, a helical discontinuity is created along the fiber by virtue of the resulting meandering of the core 60 about the fiber axis, Z-Z, as illustrated in FIG. 6. The pitch of the helical core and, hence, the periodicity of the mode coupling is controlled by the appropriate selection of the fiber-drawing rate and the rotational rate of the inner crucible outlet aperture.

Figure 7:
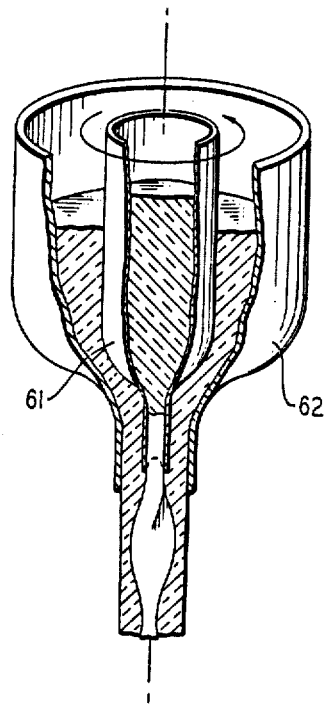
FIG. 7 shows a second method of fabricating a fiber in accordance with the present invention.

In an alternate arrangement, illustrated in FIG. 7, the outlet aperture of the inner crucible 61 is coaxially aligned with the outlet aperture of the outer crucible 62. However, by providing the inner crucible outlet with an asymmetric cross section, such as, for example, an elliptical cross section, the effect is to continuously change the location of the source of core material as the inner crucible is rotated. The result is to form a helical discontinuity in the core configuration as the fiber is drawn.

Figure 8:
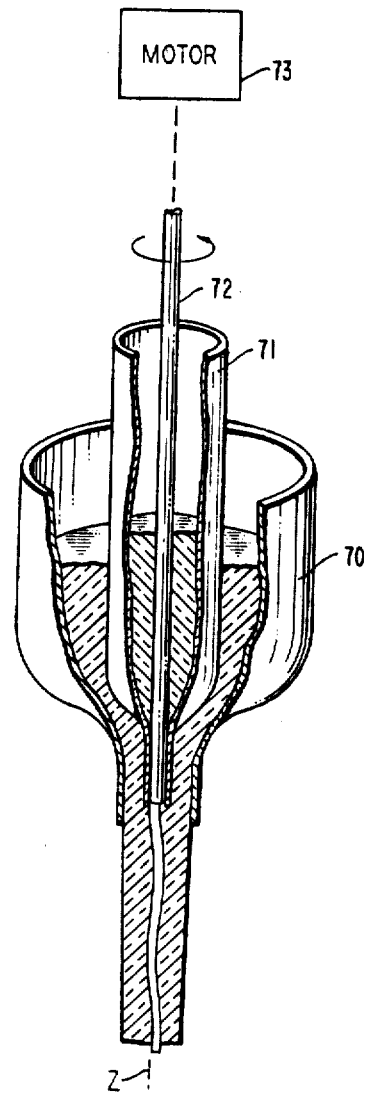
FIGS. 8 and 9 show a third method of fabricating a fiber in accordance with the present invention.

Substantially the same result can be obtained by means of a rotating rod disposed within the outlet aperture of the inner crucible, as illustrated in FIG. 8. In this arrangement both crucibles 70 and 71 remain stationary, with their outlet apertures coaxially aligned along a common axis Z-Z. The flow of core material is controlled by a hollow rod 72 which extends into the outlet of crucible 71, and whose longitudinal axis is colinear with the crucible axis Z-Z. To vary the effective location of the source of core material, the lower end of rod 72 is provided with an opening that is off center. Thus, as the rod is rotated about its axis by a motor 73, the core material, flowing through the off-centered opening, assumes the helical configuration shown in FIG. 6.

Figure 9:
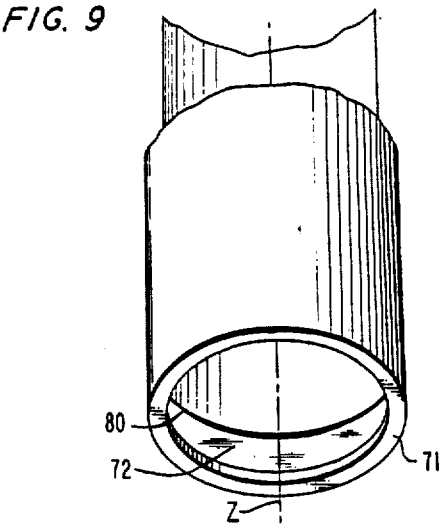

FIG. 9 shows, in cross section, the end of rod 72 located in the outlet aperture of crucible 71. This particular rod configuration, formed by cutting a longitudinal groove 80 in the rod, illustrates one means of obtaining the desired off-centered aperture which effectively produces a constantly changing outlet location for crucible 71 as the rod is rotated.

Figure 10:
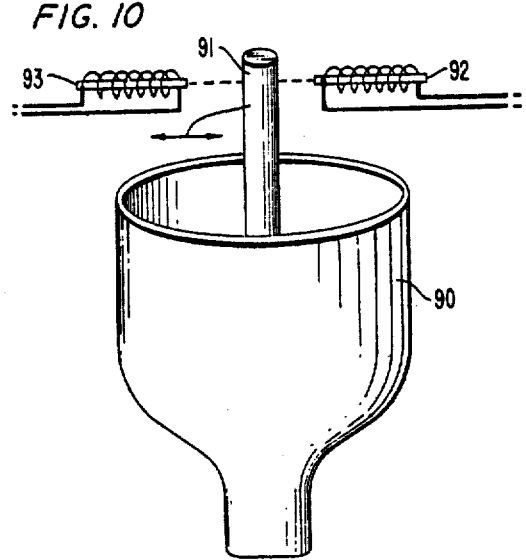
FIGS. 10 and 11 show a fourth method of fabricating a fiber in accordance with the invention.

Another means of producing a periodic change in the location of the source of core material is to employ a linear displacement of a rod 91 that extends into the outlet aperture of the core material crucible 90, as illustrated in FIG. 10. Rod 91 is caused to oscillate back and fourth by suitable means, such as the solenoid drive 92-93.

Figure 11:
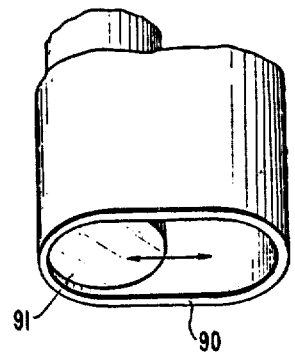

FIG. 11 shows a bottom view of crucible 90 with the end of rod 91 blocking a portion of the outlet aperture. As the rod moves back and forth, the source of core material is displaced periodically, causing a periodic core perturbation in the drawn fiber.

As noted above, the periodically perturbation is a function of the fiber pulling rate and the source rotation or translation rate. Both of these parameters can remain constant or, alternatively, one or both can be varied in a prescribed manner to produce a fiber having perturbation periods which are either constant, or which vary in a defined manner.

What is claimed is:
1. A multimode optical fiber comprising:
    an inner core region surrounded by an outer cladding region of lower refractive index;
    CHARACTERIZED IN THAT:
    said fiber includes a third region whose refractive index is different than that of said core region;

and in that said third region intercepts a portion of the optical wave field guided by said core and meanders about the longitudinal axis of said fiber in a manner to cause mode coupling.

2. The fiber according to claim 1 wherein said third region is embedded within said core region.

3. The fiber according to claim 1 wherein said third region has a different refractive index than said cladding and is embedded therein.

4. A multimode optical fiber comprising:
an inner core region surrounded by an outer cladding of lower refractive index;
CHARACTERIZED IN THAT
said core region meanders about the longitudinal axis of said fiber such that the spatial variation of said region in the longitudinal direction has significant spectral components at the beat wavelengths of the modes guided by said multimode fiber.

* * * * *